(12) United States Patent
Dai et al.

(10) Patent No.: US 11,918,101 B2
(45) Date of Patent: Mar. 5, 2024

(54) CONNECTING STRUCTURE FOR ELECTRIC CLEANING DEVICE HANDLE AND HEAD ASSEMBLY

(71) Applicant: SHANGHAI SHIFT ELECTRICS CO., LTD., Shanghai (CN)

(72) Inventors: Xiaoguo Dai, Shanghai (CN); Zhenwu Xu, Shanghai (CN)

(73) Assignee: SHANGHAI SHIFT ELECTRICS CO., LTD., Shanghai (CN)

(*) Notice: Subject to any disclaimer, the term of this patent is extended or adjusted under 35 U.S.C. 154(b) by 343 days.

(21) Appl. No.: 17/602,146

(22) PCT Filed: Dec. 19, 2019

(86) PCT No.: PCT/CN2019/126631
§ 371 (c)(1),
(2) Date: Oct. 7, 2021

(87) PCT Pub. No.: WO2020/207050
PCT Pub. Date: Oct. 15, 2020

(65) Prior Publication Data
US 2022/0142343 A1 May 12, 2022

(30) Foreign Application Priority Data

Apr. 9, 2019 (CN) .......................... 201910282128.4

(51) Int. Cl.
*A46B 13/02* (2006.01)
*A46B 5/00* (2006.01)
(Continued)

(52) U.S. Cl.
CPC .......... *A46B 5/0008* (2013.01); *A46B 13/023* (2013.01); *A46B 15/0079* (2013.01);
(Continued)

(58) Field of Classification Search
CPC .......................... A46B 13/023; A61C 17/3481
See application file for complete search history.

(56) References Cited

U.S. PATENT DOCUMENTS

| 3,072,938 | A | 1/1963 | Phaneuf |
| 3,851,984 | A | 12/1974 | Crippa |

(Continued)

FOREIGN PATENT DOCUMENTS

| CA | 3029078 A | 1/2018 |
| CA | 3029078 C | 10/2019 |

(Continued)

OTHER PUBLICATIONS

European Patent Application No. 19924568.9; Search Report; dated Apr. 12, 2022; 4 pages.

(Continued)

*Primary Examiner* — Randall E Chin
(74) *Attorney, Agent, or Firm* — BakerHostetler

(57) ABSTRACT

Provided is a connecting structure for connecting a head assembly and a handle portion of a vibration cleaning appliance, the handle portion includes a handle housing with a hollow portion and a vibration shaft, the head assembly includes a brush handle housing with a handle interface, a blind hole is provided in the middle of the interface, the rear end of the shaft is tightly inserted into the hole; a buckle cavity is provided on the interface, the front end surface of the cavity is a buckle locking surface of the interface; a buckle combination part including a cantilever and a protrusion is provided in the housing along its rear end, the cantilever is formed in and separated from the housing, the rear end of the cantilever is provided with the protrusion, a locking surface of the combination part is provided on the protrusion accommodated by the cavity of the interface.

11 Claims, 9 Drawing Sheets

(51) Int. Cl.
*A46B 15/00* (2006.01)
*A61C 17/34* (2006.01)

(52) U.S. Cl.
CPC .. *A61C 17/3481* (2013.01); *A46B 2200/1006* (2013.01); *A46B 2200/1066* (2013.01)

(56) References Cited

U.S. PATENT DOCUMENTS

| | | |
|---|---|---|
| 5,247,716 A | 9/1993 | Bock |
| 6,920,659 B2 | 7/2005 | Cacka et al. |
| 8,448,283 B2 | 5/2013 | Caville et al. |
| 2002/0120991 A1 | 9/2002 | Cacka et al. |
| 2005/0189000 A1 | 9/2005 | Cacka et al. |
| 2010/0101032 A1 | 4/2010 | Kressner |
| 2011/0138552 A1 | 6/2011 | Caville et al. |
| 2014/0150190 A1 | 6/2014 | Fattori |
| 2016/0302900 A1 | 10/2016 | Utsch et al. |
| 2019/0174909 A1* | 6/2019 | Huang ............... F16D 1/05 |
| 2019/0239993 A1 | 8/2019 | Dai et al. |

FOREIGN PATENT DOCUMENTS

| | | |
|---|---|---|
| CN | 101969880 A | 2/2011 |
| CN | 101969880 B | 1/2013 |
| CN | 103654987 A | 3/2014 |
| CN | 105411713 A | 3/2016 |
| CN | 103654987 B | 8/2016 |
| CN | 106175957 A | 12/2016 |
| CN | 106456302 A | 2/2017 |
| CN | 105411713 B | 4/2017 |
| CN | 106175957 B | 1/2018 |
| EP | 1349469 A1 | 10/2003 |
| EP | 2242443 A2 | 10/2010 |
| EP | 3123978 A1 | 2/2017 |
| EP | 2242443 B1 | 8/2017 |
| EP | 3476364 A1 | 5/2019 |
| EP | 3476364 B1 | 3/2021 |
| ES | 2759242 T3 | 5/2020 |
| FR | 2926210 A1 | 7/2009 |
| JP | S48-031723 Y | 9/1973 |
| JP | H06-193636 A | 7/1994 |
| JP | 3009127 U | 3/1995 |
| JP | H07-148020 A | 6/1995 |
| JP | H07-509151 A | 10/1995 |
| JP | 3029075 U | 9/1996 |
| JP | 2003-013949 A | 1/2003 |
| JP | 2003-210495 A | 7/2003 |
| JP | 2005-248987 A | 9/2005 |
| JP | 2010-512810 A | 4/2010 |
| JP | 2015-160127 A | 9/2015 |
| JP | 6217843 B2 | 10/2017 |
| JP | 2019-522541 A | 8/2019 |
| JP | 6816169 B2 | 1/2021 |
| WO | WO 2002/054906 A1 | 7/2002 |
| WO | WO 2009/092957 A2 | 7/2009 |
| WO | WO 2015/147054 A1 | 10/2015 |
| WO | WO 2018/000448 A1 | 1/2018 |
| WO | WO 2018/114638 A1 | 6/2018 |

OTHER PUBLICATIONS

International Patent Application No. PCT/CN2019/126631; Int'l Search Report; dated Feb. 26, 2020; 2 pages.

* cited by examiner

CONNECTING STRUCTURE FOR ELECTRIC CLEANING DEVICE HANDLE AND HEAD ASSEMBLY

TECHNICAL FIELD

The present invention relates to a connecting structure for connecting a head assembly and a handle portion of a vibrating electric cleaning appliance, and more specifically to a connecting structure for connecting the head assembly and the handle portion of the electric cleaning appliances, such as a vibrating electric toothbrush, a vibrating electric shaver, a vibrating electric cleanser, a vibrating electric shower, and the like.

BACKGROUND

Classified according to the movement mode of the head assembly, existing electric cleaning appliances, such as electric toothbrushes, may usually be divided into three categories, that is, the cleaning element and the cleaning element carrier on the head assembly make reciprocating linear motion (including swinging up and down or swinging left and right, referred to as vibrating type); the cleaning element and the cleaning element carrier on the head assembly make reciprocating rotation motion (referred to as rotary type); and the entire head assembly makes reciprocating rotation motion (referred to as acoustic wave type). Taking the electric toothbrushes as an example, the above three types are abbreviated as vibrating electric toothbrushes, rotary electric toothbrushes, and acoustic wave electric toothbrushes, respectively, in the present invention.

Vibrating electric cleaning appliances, such as electric toothbrushes, have become increasingly popular in the market due to their compact and exquisite characteristics. At present, most of the vibrating electric cleaning appliances, such as electric toothbrushes, in the market are disposable, that is, the head assembly and the handle portion are non-detachable. There are also detachable head assemblies and handle portions. In the detachable type, the head assembly is directly connected to the rotating shaft (or handle housing) by the protrusions (or grooves) and grooves (or protrusions) on the brush handle housing and the rotating shaft (or handle housing), respectively. An user only needs to pull out the old head assembly, and then install a new one for replacement. This kind of the connecting structure has potential safety hazards: if the protrusion and groove fit too tightly, the user needs to pull and insert forcefully when replacing the head assembly and may be injured due to too much force; if the protrusion and groove fit not tightly enough, the head assembly is easy to slip off or even fly out. In addition, the creep of plastic and frequent plugging and unplugging easily damage the connecting structure, thereby affecting the service life of the electric cleaning appliances, such as the electric toothbrushes.

SUMMARY

The task of the present invention is to provide a detachable connecting structure for connecting the head assembly and the handle portion of the vibrating electric cleaning appliance, which has a simple production process, is easy replacement, and is safe and reliable in use.

According to the present invention, there is provided a connecting structure for connecting a head assembly and a handle portion of a vibrating electric cleaning appliance. The cleaning appliance includes a handle portion and a head assembly detachably mounted on the handle portion. The handle portion includes a handle housing with a hollow portion at the rear end, a vibration motor, and a vibration shaft. The head assembly is assembled on the handle portion along the axial direction of the vibration shaft. The head assembly includes a cleaning element and a brush handle housing. The brush handle housing has a central axis $L_1$. A handle interface is disposed on the top of the front end of the handle housing. The handle interface and the vibration shaft are accommodated in the hollow portion of the brush handle housing. A blind hole of the handle interface is disposed in the middle of the handle interface. The rear end portion of the vibration shaft is tightly inserted into the blind hole of the handle interface. The handle interface is provided with a buckle cavity of the handle interface in a length direction of the vibration shaft along a direction perpendicular to the central axis $L_2$ of the vibration shaft. The front end surface of the buckle cavity is a buckle locking surface of the handle interface. A buckle combination part including a buckle cantilever and a buckle protrusion is provided in the brush handle housing along its rear end, and extends along a direction from the head assembly towards the handle portion in the brush handle housing. The buckle cantilever is formed in the brush handle housing and is separated from the brush handle housing. The buckle cantilever has a central axis $L_3$. The rear end of the buckle cantilever is provided with the buckle protrusion. A locking surface of the buckle combination part is provided on the buckle protrusion. The buckle protrusion is accommodated by the buckle cavity.

Preferably, a contact part of the cleaning element and an object to be cleaned is located on one side of the central axis $L_1$ of the brush handle housing. The buckle cavity and the buckle protrusion are located on one side of the central axis $L_1$ of the brush handle housing opposite to the cleaning element.

Preferably, the buckle combination part extends along a direction from the head assembly towards the handle portion parallel to a direction of the central axis $L_1$ of the brush handle housing in the brush handle housing.

The included angle among the central axis $L_1$ of the brush handle housing, the central axis $L_2$ of the vibration shaft and the central axis $L_3$ of the buckle cantilever may be set to be less than 30°, and the included angle between the buckle protrusion and the central axis $L_2$ of the vibration shaft is set to be 60°-120°.

Preferably, there are at least one group of the buckle combination part and the buckle cavity that are respectively provided in the brush handle housing or on the handle interface, and generate a buckle retention force $F_1$.

Preferably, the material of the vibration shaft is metal. More preferably, the material of the vibration shaft is stainless steel.

The rear end portion of the vibration shaft may be provided with groove(s).

The buckle retention force $F_1$ may be 0.5N to 50N; preferably, the buckle retention force $F_1$ is 0.7N to 30N; more preferably, the buckle retention force ($F_1$) is 10N to 20N.

With the connecting structure of the present invention, the head assembly and the handle portion are easy to be disassembled. The user only needs to replace the head assembly, and the handle portion can be reused, which can therefore save the use cost and facilitate promotion. The connecting structure is simple in manufacturing process, without increasing the volume of the connecting part, and has the advantages of easy replacement, safety and reliability.

EXPLANATION OF REFERENCE NUMERALS

Figure 1:
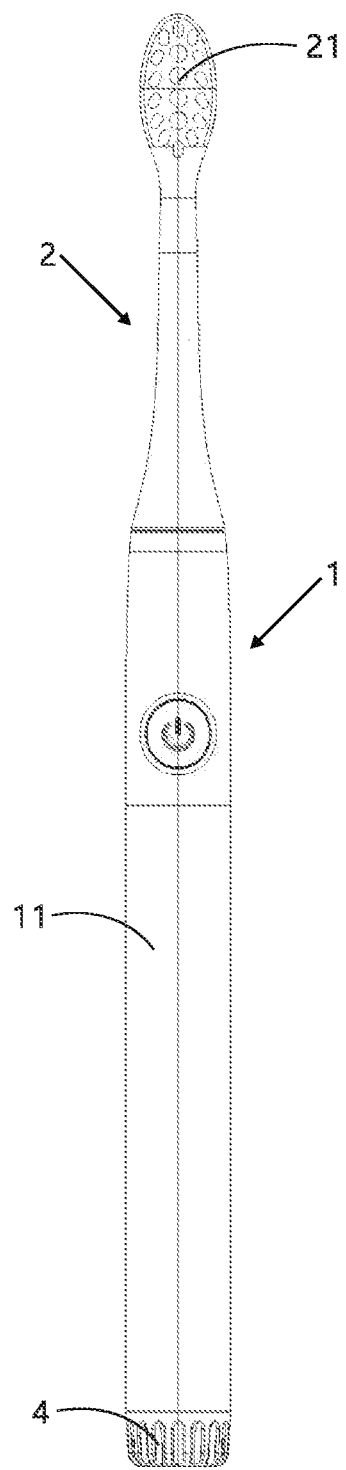
FIG. 1 is a schematic diagram of a vibrating electric toothbrush.

1 Handle portion
2 Head assembly
3 vibration shaft
4 Handle back cover
11 Handle housing
12 Switch button
13 Rack
14 Circuit board
15 Battery
16 Spring
17 Power negative plate
18 Power positive plate
19 Vibration motor
191 Motor eccentric vibrator
21 Cleaning element
22 Brush handle housing
23 Locking surface of buckle combination part
24 Buckle cantilever
25, 26 vibration shaft joint circular arc surface and vibration shaft joint surface respectively provided on housing
27, 28 Fastening surface of brush handle
29 Buckle protrusion
31 Groove of vibration shaft
32 vibration shaft circular arc surface disposed on vibration shaft
33 vibration shaft plane disposed on vibration shaft
111 Handle interface
112 Buckle locking surface of handle interface
113 Buckle cavity of handle interface
114 Blind hole of handle interface
115, 116 Fastening surface of handle interface
$L_1$ Central axis of brush handle housing
$L_2$ Central axis of vibration shaft
$L_3$ Central axis of buckle cantilever

DETAILED DESCRIPTION

Hereinafter, the exemplary embodiments of the present invention will be described in more detail by taking an electric toothbrush as an example and in conjunction with the accompanying drawings. As stated above, although the electric toothbrush is only used below as an example for explanation, the present invention is not limited thereto. The present invention is also applicable to the cleaning appliances, such as a vibrating electric shaver, a vibrating electric cleanser, a vibrating electric shower, and the like.

The terminology used herein is for the purpose of describing particular exemplary embodiments only and is not intended to be limiting. For the sake of clarity, words expressing spatial relative positions, such as "front end", "rear end", etc., are used in this specification to simply describe the interrelation between one element or feature and another element(s) or feature(s) as shown in the drawings, and define that along the direction of the central axis $L_1$ of the brush handle housing, the end of each component facing the cleaning element is the front end, and the end of each component facing away from the cleaning element is the rear end.

In this specification, except for the specific surface clearly indicated as "circular arc surface" or "arc surface", other unrestricted "surfaces" may be of any shape, preferably "plane".

The singular forms "a", "an" and "the" used herein may include plural forms unless the context clearly indicates otherwise. The words "comprising", "including" and "having" are broad in scope and specify the presence of stated features, collections, steps, operations, elements and/or components, but do not preclude the presence or addition of one or more other features, collections, steps, operations, elements, components, and/or groups thereof.

The term "and/or" used in this application comprises any one or all combinations of one or more listed relevant words.

In all the drawings, similar reference numerals indicate similar components.

Figure 2:
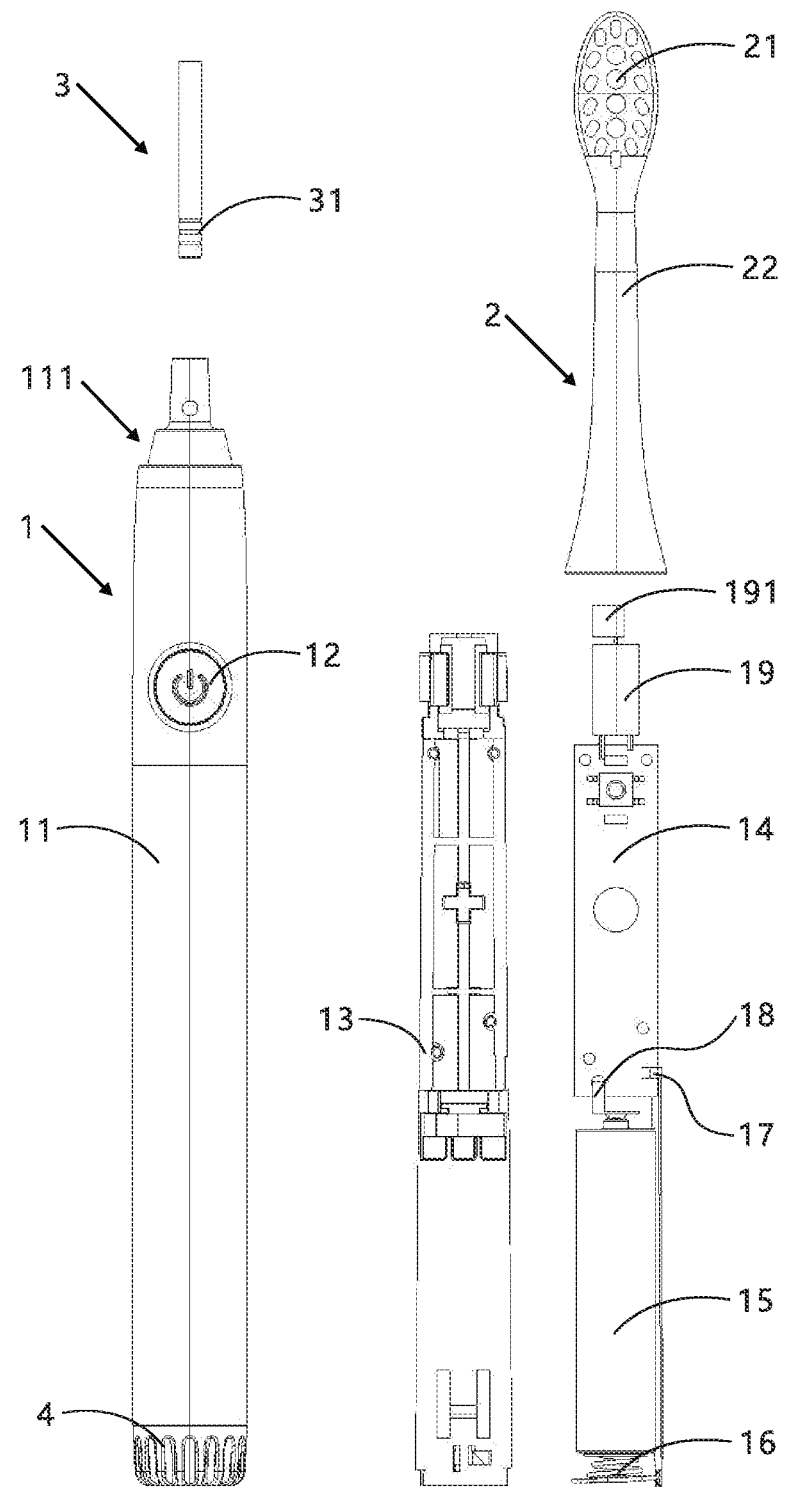
FIG. 2 is an exploded view of the electric toothbrush as shown in FIG. 1, which illustrates the assembly relationship between the handle portion and the head assembly.
Figure 3:
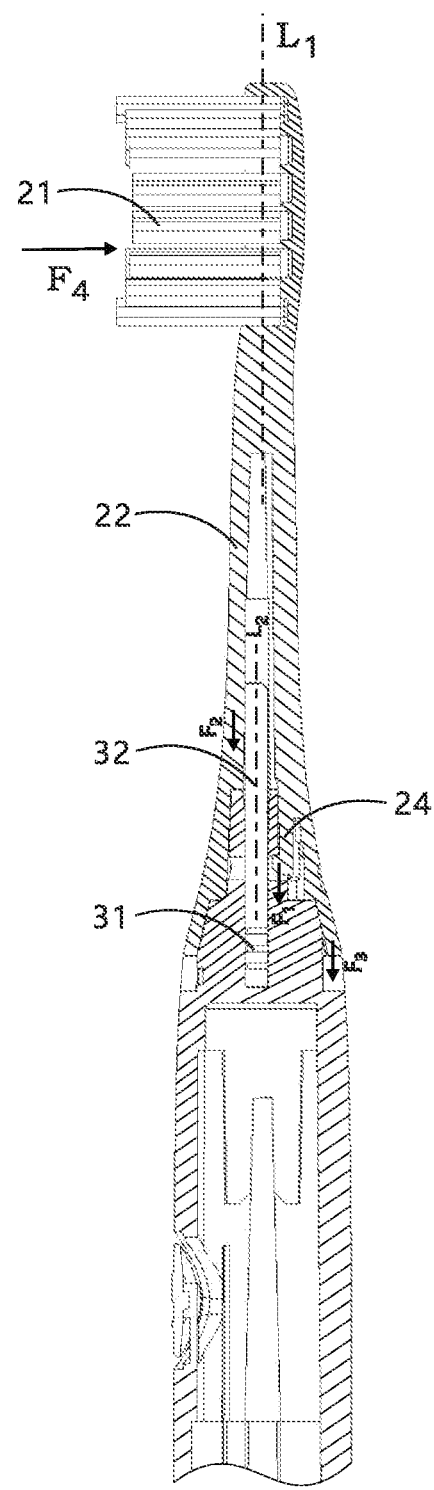
FIG. 3 is a left sectional view of the connection between the handle portion and the head assembly of the electric toothbrush as shown in FIG. 1.
Figure 6:
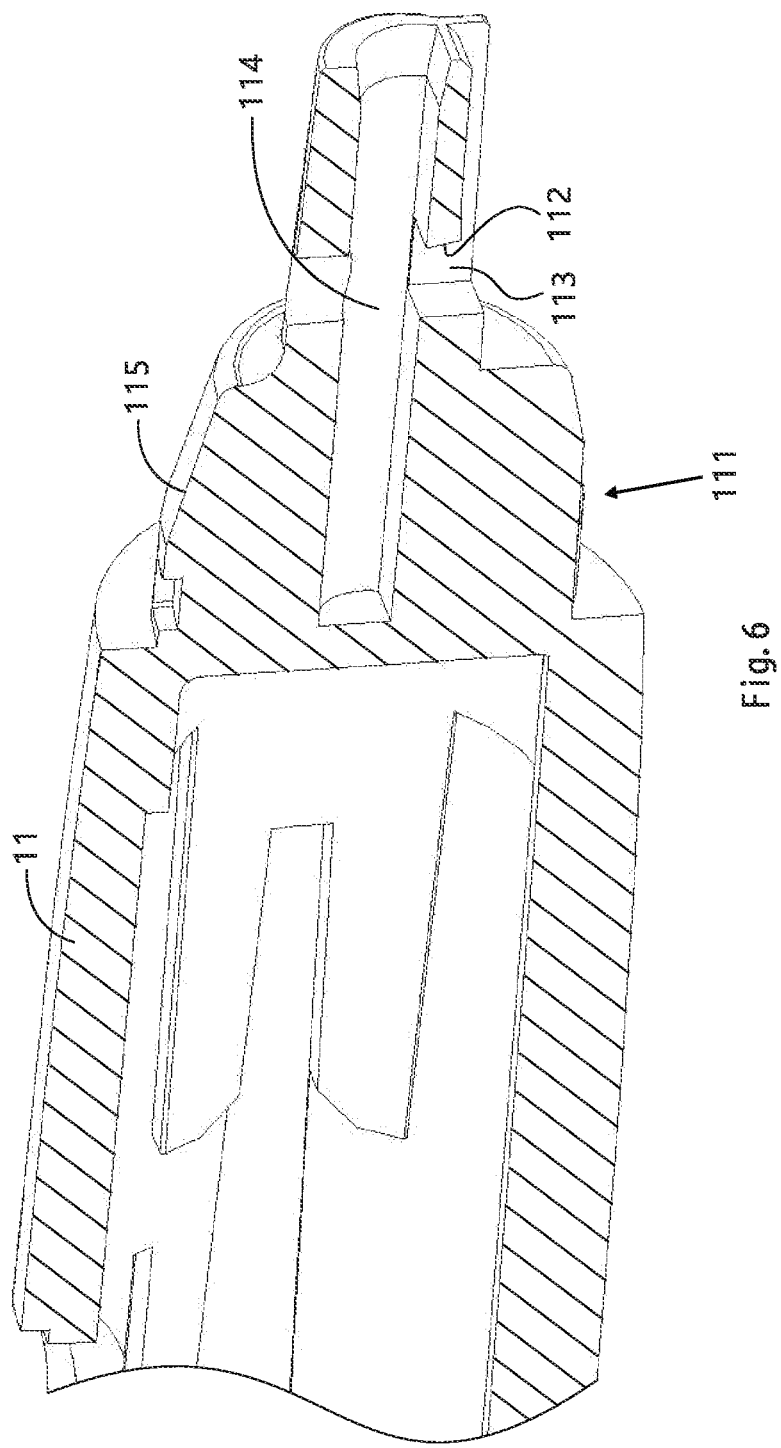
FIG. 6 is a schematic sectional view of the handle interface of the electric toothbrush as shown in FIG. 1.
Figure 7:
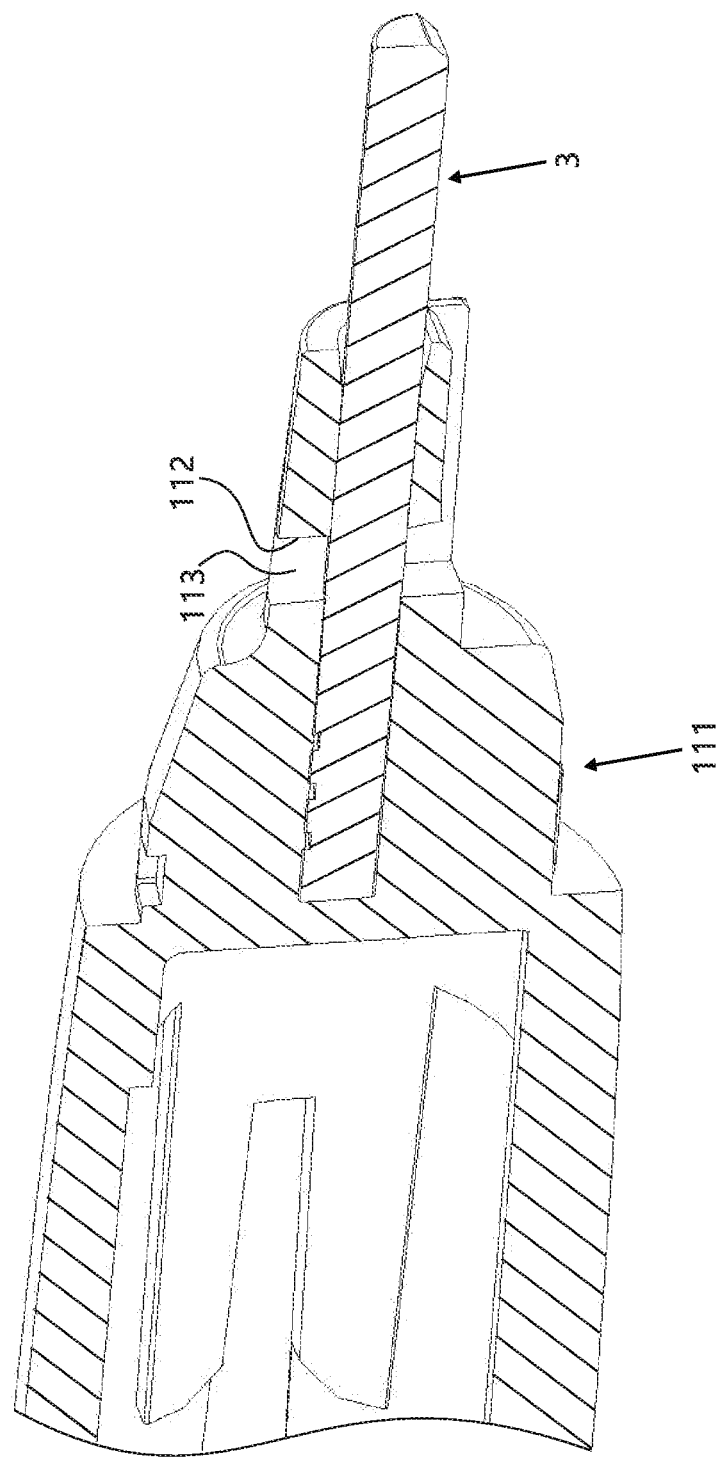
FIG. 7 is a schematic sectional view of the handle interface and vibration shaft of the electric toothbrush as shown in FIG. 1.

FIGS. 1-8 show an embodiment of the vibrating electric toothbrush of the present invention. The vibrating electric toothbrush of the present invention includes a handle portion 1 and a head assembly 2 detachably mounted on the handle portion 1. The head assembly 2 is assembled on the handle portion 1 along the axial direction of the vibration shaft 3. The handle portion 1 includes a handle housing 11, a switch button 12, a rack 13, a circuit board 14, a battery 15, a spring 16, a power negative plate 17, a power positive plate 18, a vibration motor 19, a vibration shaft 3, and a handle back cover 4. The head assembly 2 includes a cleaning element 21 and a brush handle housing 22. The handle housing 11 includes a rack 13, a circuit board 14, a battery 15, a spring 16, a power negative plate 17, a power positive plate 18, and a vibration motor 19. A handle interface 111 is provided on the top of the front end of the handle housing 11 (the end close to the head assembly 2). The handle interface 111 and vibration shaft 3 are accommodated in the hollow portion of the rear end of the brush handle housing 22. A blind hole 114 of the handle interface is provided in the middle of the handle interface 111 (FIG. 6). The rear end portion of the vibration shaft 3 is provided with multiple groove(s) 31 (FIG. 2, FIG. 3). The rear end portion of the vibration shaft 3 with grooves 31 can be inserted into the blind hole 114 of the handle interface, which are closely fitted. The handle interface 111 is provided with a buckle cavity 113 (FIG. 5, FIG. 6) of the handle interface in the length direction of the vibration shaft 3 along the direction perpendicular to the central axis $L_2$ (FIG. 3) of the vibration shaft 3. The front end surface of the buckle cavity 113 is a buckle locking surface 112 of the handle interface (FIG. 7).

Figure 8:
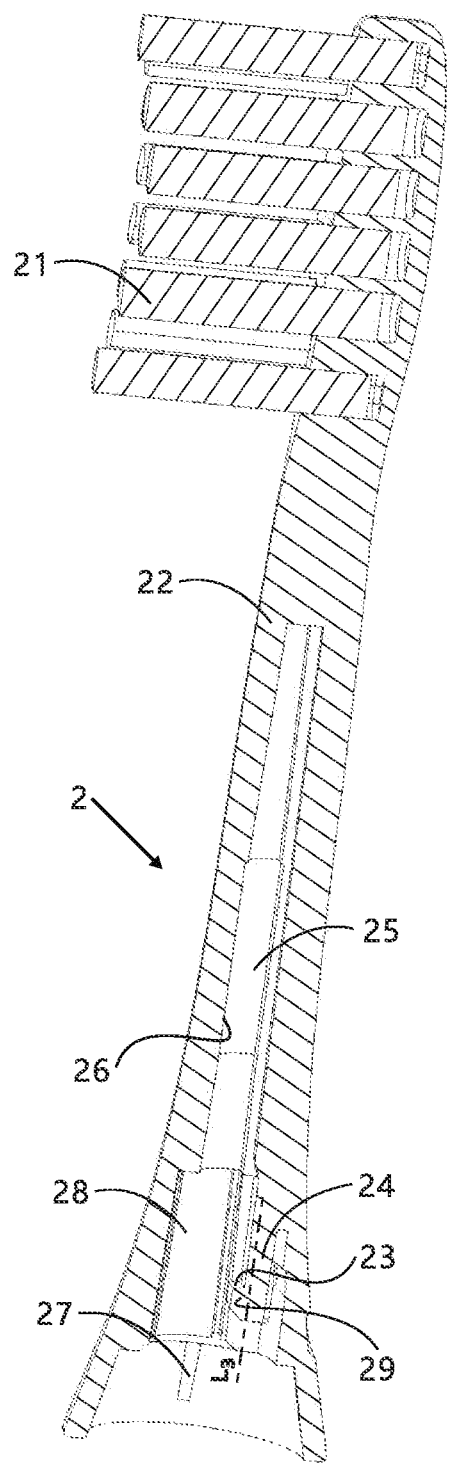
FIG. 8 is a schematic sectional view of the head assembly of the electric toothbrush as shown in FIG. 1.

As shown in FIG. 8, the front end of the head assembly 2 is provided with a cleaning element 21. A buckle combination part including a buckle cantilever 24 and a buckle protrusion 29 is provided in the brush handle housing 22 of the head assembly 2 along its rear end (the direction close to the handle portion 1), and extends in the brush handle housing 22 along the direction from the head assembly 2 towards the handle portion 1, preferably parallel to the central axis $L_1$ of the brush handle housing 22. The buckle cantilever 24 is formed in the brush handle housing 22 and is separated from the brush handle housing 22. The central axis of the buckle cantilever is $L_3$. A buckle protrusion 29 is disposed at the rear end of the buckle cantilever 24, and protrudes from the buckle cantilever 24 towards the direction close to the central axis $L_2$ of the vibration shaft 3 (FIG. 3). A locking surface 23 of the buckle combination part is provided on the buckle protrusion 29. The normal direction of the locking surface 23 of the buckle combination part is approximately parallel to the central axis $L_2$ of the vibration shaft 3. The buckle protrusion 29 on the brush handle housing 22 is accommodated by the buckle cavity 113 (FIG. 5, FIG. 6) of the handle interface on the handle interface 111. The locking surface 23 of the buckle combination part fits with the buckle locking surface 112 of the handle interface to generate a buckle retention force $F_1$ (i.e., a static buckle retention force $F1_S$, FIG. 3) that is approximately parallel to the central axis $L_2$ of the vibration shaft 3.

As shown in FIG. 3, in the present invention, the contact part of the cleaning element 21 and the object to be cleaned, such as teeth, is arranged on one side of the central axis $L_1$ of the brush handle housing 22 (on the left side of the central axis $L_2$ in the figure). The buckle cavity 113 and the buckle protrusion 29 are arranged on one side of the central axis $L_1$ opposite to the cleaning element 21 (the right side of the central axis $L_1$ in the figure). When the user applies pressure force $F_4$ on the cleaning element 21, the head assembly 2 cannot produce a translational movement in the direction of the force since the head assembly 2 is fixedly connected with the handle interface 111, and the head assembly 2 can only warp in a clockwise direction relative to the handle interface 111. At this time, the buckle protrusion 29 (FIG. 5, FIG. 6) further enters the buckle cavity 113, such that the buckle protrusion 29 and the buckle cavity 113 are more reliably connected together to ensure that the brush head assembly 2 is not separated from the handle portion 1 when the toothbrush works. If the contact part of the cleaning element 21 and the object to be cleaned, such as teeth, the buckle cavity 113, and the buckle protrusion 29 are all arranged on the same side of the central axis $L_1$ of the brush handle housing 22 (e.g., all on the left side of FIG. 3) as designed by the existing electric toothbrush, the head assembly 2 can only warp in a clockwise direction relative to the handle interface 111 since the head assembly 2 is fixedly connected to the handle interface 111, when the user applies pressure $F_4$ on the cleaning element 21. At this time, the buckle protrusion 29 tends to separate from the buckle cavity 113, thereby weakening the bonding strength of the buckle protrusion 29 and the buckle cavity 113. When $F_4$ increases to a larger value, the buckle protrusion 29 may disengage from the buckle cavity 113, causing the brush head assembly 2 and the handle portion 1 to disengage and thereby causing the head assembly 2 to disengage from the handle portion 1 and hurt the user, or even causing the user to suffocate.

Figure 4:
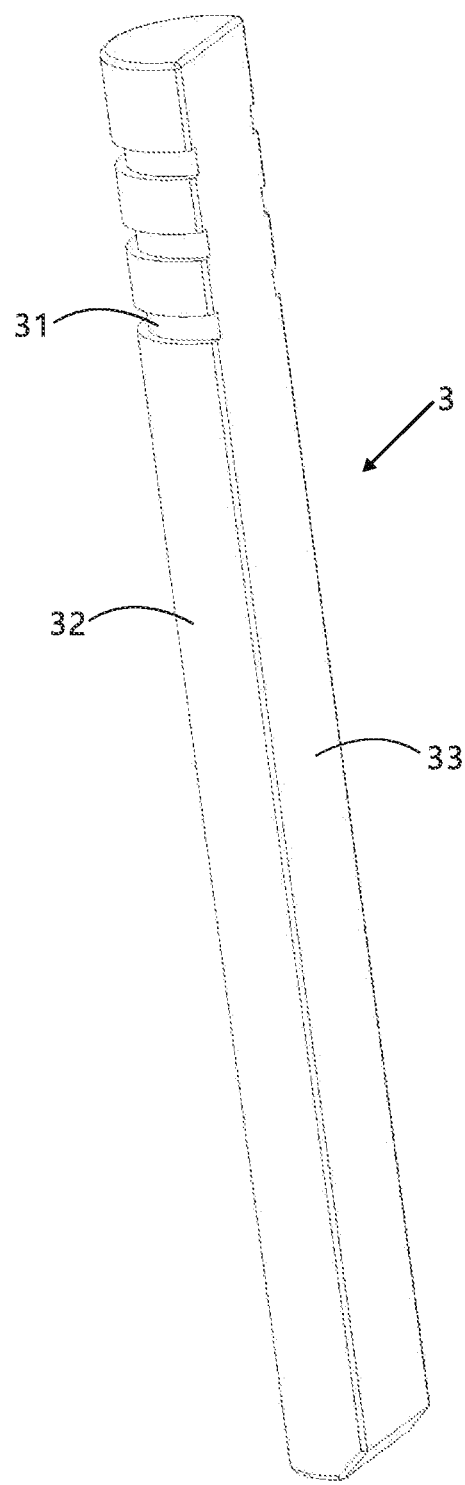
FIG. 4 is a schematic diagram of the vibration shaft of the electric toothbrush as shown in FIG. 1.
Figure 5:
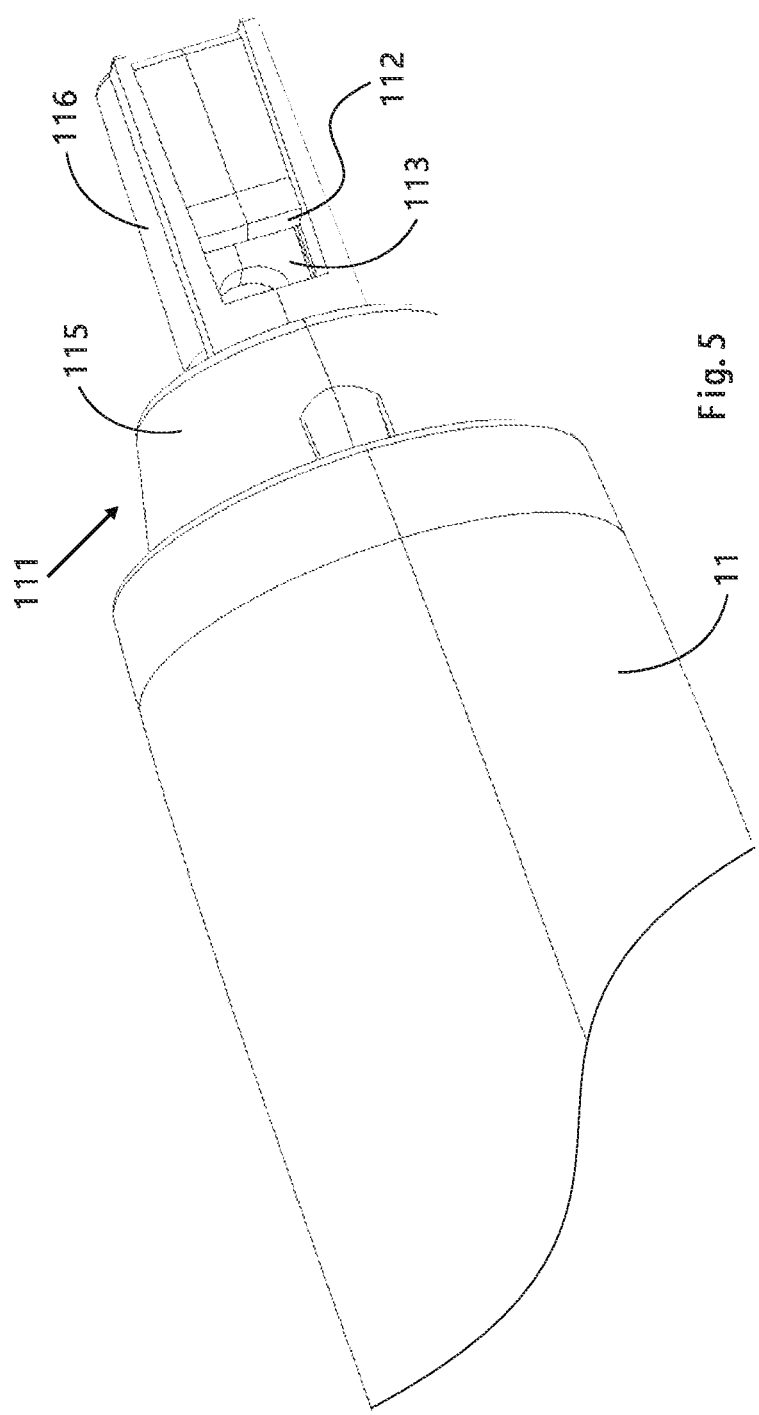
FIG. 5 is a schematic diagram of the handle interface of the electric toothbrush as shown in FIG. 1.

As shown in FIG. 4, in the brush handle housing 22 is further provided a corresponding vibration shaft joint circular arc surface 25 and a vibration shaft joint surface 26 that are respectively matched with the vibration shaft circular arc surface 32 and vibration shaft surface 33 disposed on the vibration shaft 3 (FIG. 8), such that a retention component force $F_2$ (FIG. 3) approximately parallel to the central axis $L_2$ of the vibration shaft 3 is generated between the vibration shaft 3 and the brush handle housing 22, that is, the resultant force of the friction forces generated by the joint circular arc surface 25 and the joint surface 26 is approximately parallel to the central axis $L_2$ of the vibration shaft 3. It should be noted that at present, the machining accuracy of the circular arc surface can be very high in the machining process of the shaft, and even the diameter tolerance can be easily maintained at ±0.002 mm, thereby making the fit more precise. Based on this, the vibration shaft arc surface 32 arranged on the vibration shaft 3 is selected as a circular arc surface in this example. Obviously, the arc surface 32 can also be of any other shapes. In the brush handle housing 22 is provided a corresponding brush handle fastening surface 27 and a brush handle fastening arc surface 28 that are respectively matched with the fastening arc surface 115 and the fastening arc surface 116 of the handle interface (FIG. 8), such that a retention component force $F_3$ approximately parallel to the central axis $L_2$ of the vibration shaft 3 is generated between the handle interface 111 and the brush handle housing 22 (FIG. 3). The brush handle housing 22 is provided with a hollow portion close to the handle interface 111 to accommodate the handle interface 111. The head assembly 2 can be assembled on the handle portion 1 along the axial direction of the vibration shaft 3. The handle interface 111 and the vibration shaft 3 are inserted into the brush handle housing 22. The buckle protrusion 29 on the brush handle housing 22 is accommodated by the buckle cavity 113 of the handle interface on the handle interface 111. The locking surface 23 of the buckle combination part matches with the buckle locking surface 112 of the handle interface. The buckle combination part locks the handle interface 111 to generate a buckle retention force $F1_S$ that is approximately parallel to the central axis $L_2$ of the vibration shaft. When the head assembly 2 intends to disengage from the handle interface 111, that is, when the buckle protrusion 29 is disengaged from the buckle cavity 113 of the handle interface and the buckle locking surface 112 of the handle interface, a buckle retention force $F1_R$ is generated. Under other states, the buckle retention force $F_1=F1_S$, which is approximately zero. The brush handle housing 22 and the vibration shaft 3 are tightly fitted to produce a retention force $F_2$ that is approximately parallel to the central axis $L_2$ of the vibration shaft. When the vibration motor 19 is not started, the retention force $F_2$ is a static retention force $F2_S$; when the vibration motor 19 works, the retention force $F_2$ is a dynamic retention force $F2_R$. The brush handle housing 22 and the handle interface 111 are tightly fitted to produce a retention force $F_3$ that is approximately parallel to the central axis $L_2$ of the vibration shaft. The retention force $F_3$ is the enclasp force of the brush handle housing 22 and the handle interface 111 multiplied by the friction coefficient between the brush handle housing 22 and the handle interface 111. When the vibration motor 19 is not started, the retention force $F_3$ is a static retention force $F3_S$; when the vibration motor 19 works, the retention force $F_3$ is a dynamic retention force $F3_R$. The resultant force of the buckle retention force $F_1$, the retention force $F2_R$, and the retention force $F3_R$ jointly maintains the head assembly 2 and the handle portion 1 to be connected reliably and safely. Therefore, when the vibrating electric toothbrush works normally, the resultant force of $F_1$, $F2_R$ and $F3_R$ can ensure that the head assembly 2 is firmly held on the handle portion 1.

When the battery 15 supplies power to the vibration motor 19, the vibration motor 19 drives the motor eccentric vibrator 191 to rotate and generates vibration whose amplitude changes periodically. Driven by the vibration motor 19, the rack 13 also vibrates with periodically varying amplitude, and accordingly the rack 13 drives the handle housing 11 to generate vibration with periodically varying amplitude. The handle housing 11 drives the handle interface 111 and the vibration shaft 3 to generate vibration with periodically varying amplitude. The handle interface 111 and the vibration shaft 3 drive the brush handle housing 22 and the cleaning element 21 to generate vibration with periodically varying amplitude. The handle housing 11 and the brush handle housing 22 are made of plastic injection molding. In the tightly fitted state, the plastic may creep. The creep will weaken the enclasp force between plastics in the tightly fitted state and accordingly decrease the retention force $F_2$, $F_3$, and thereby affect the reliable connection between the head assembly 2 and the handle portion 1. In addition, the handle interface 111 drives the brush handle housing 22 to generate vibration with periodically varying amplitude, thereby generating a force with periodically varying amplitude between the fastening surfaces 115, 116 of the handle interface and the brush handle fastening surfaces 27, 28, and generating a disengage force $F5_R$ (not shown in the figure) with periodically varying amplitude between the fastening surfaces 115, 116 of the handle interface and the brush handle fastening surfaces 27, 28. The direction of the disengage force $F5_R$ is approximately parallel to the central axis $L_2$ of the vibration shaft 3. The force with periodically varying amplitude and the static enclasp force of the brush handle housing 22 and the handle interface 111 are superimposed to form the dynamic enclasp force of the brush handle housing 22 and the handle interface 111. The dynamic friction force $F7_R$ (not shown in the figure) is the product of the dynamic enclasp force and friction coefficient. Obviously, the dynamic enclasp force of the brush handle housing 22 and the handle interface 111 may be less than the static enclasp force thereof at certain moments. The amplitude of the dynamic friction force $F7_R$ also change periodically. The disengage force $F5_R$ and the dynamic friction force $F7_R$ synthesize the dynamic retention component force $F3_R$, such that the amplitude of the dynamic retention component $F3_R$ change periodically under the influence of the vibration motor 19, and may be less than the amplitude of the static retention force $F3_S$ at certain moments in a cycle.

In the same way, the vibration shaft 3 drives the brush handle housing 22 to generate vibration with periodically varying amplitude, thereby generating a force with periodically varying amplitude between the vibration shaft circular arc surface 32, the vibration shaft surface 33 and the corresponding vibration shaft joint circular arc surface 25, the vibration shaft joint surface 26, and generating a disengage force $F6_R$ (not shown in the figure) with periodically varying amplitude in the direction perpendicular to the normal direction of the vibration shaft circular arc surface 32, the normal direction of the vibration shaft surface 33, the normal direction of the vibration shaft joint circular arc surface 25, and the normal direction of the vibration shaft joint surface 26. The direction of the disengage force $F6_R$ with periodically varying amplitude is approximately parallel to the central axis $L_2$ of the vibration shaft 3. The force with periodically varying amplitude and the static enclasp force of the brush handle housing 22 and the vibration shaft 3 are superimposed to form the dynamic enclasp force of the brush handle housing 22 and the vibration shaft 3. The dynamic friction force $F8_R$ (not shown in the figure) is the product of the dynamic enclasp force and friction coefficient. Obviously, the dynamic enclasp force of the brush handle housing 22 and the vibration shaft 3 may be less than the static enclasp force thereof at certain moments. The amplitude of the dynamic friction force $F8_R$ also change periodically. The disengage force $F6_R$ with periodically varying amplitude and the dynamic friction force $F8_R$ with periodically varying amplitude synthesize the dynamic retention force $F2_R$, which is the resultant force of the disengage force $F6_R$ and the dynamic friction force $F8_R$, such that the amplitude of the dynamic retention force $F2_R$ change periodically under the influence of the vibration motor 19, and may be less than the amplitude of the static retention force $F2_S$ at certain moments in a cycle. When the dynamic retention force $F2_R$ and the dynamic retention force $F3_R$ are under the combined influence of the disengage forces $F5_R$, $F6_R$ with periodically varying amplitude and the dynamic friction forces $F7_R$, $F8_R$, at certain moments, the head assembly 2 may even disengage from the handle portion 1. The disengaged head assembly 2 may cause harm to a human body, such as suffocation, etc.

It can be seen from the above analysis that the resultant force of the dynamic buckle retention force $F_1$, the dynamic retention force $F2_R$, and the dynamic retention force $F3_R$ should ensure that the head assembly 2 remains on the handle portion 1 when the vibrating electric toothbrush works normally, while the dynamic retention force $F2_R$ and the dynamic retention force $F3_R$ generated by the existing vibrating electric toothbrush structure cannot ensure that the head assembly 2 is held on the handle portion 1. In order to further guarantee that the head assembly 2 is held on the handle portion 1, the present invention provides a buckle combination part in the brush handle housing 22, and a buckle cavity 113 of the handle interface and a buckle locking surface 112 of the handle interface on the handle interface 111. By the fit of the buckle combination part with the buckle cavity 113 of the handle interface and the buckle locking surface 112 of the handle interface, the buckle retention force $F_1$ is generated. The structure of the present invention can keep the buckle retention force $F_1$ basically unchanged either in dynamic or static state (i.e., $F_{1S} \cong F_{1R}$), and the buckle retention force $F_1$ will not be affected by plastic creep. The applicant has derived from a large number of experiments that if the buckle retention force $F_1$ is maintained at 0.5N to 50N, it can not only ensure that the head assembly 2 can be readily assembled on the handle portion 1, but also the head assembly 2 can be reliably fixed to the handle portion 1 when the toothbrush works. Preferably, the buckle retention force $F_1$ is maintained at 0.7N to 30N, and more preferably, the buckle retention force $F_1$ is maintained at 10N to 25N. According to the present invention, multiple buckle combination parts and multiple buckle cavities of the handle interface may also be provided.

In the present invention, by the tight fit of the vibration shaft circular arc surface 25 and the vibration shaft joint surface 26 with the vibration shaft circular arc surface 32 and the vibration shaft surface 33 respectively, and by the tight fit of the brush handle fastening arc surface 27 and the fastening arc surface 28 with the fastening arc surface 115 and the fastening arc surface 116 of the handle interface respectively, the vibration of the vibration motor 19 is transported to the head assembly 2 and then to the cleaning element 21 to achieve the purpose of cleaning teeth.

As shown in FIG. 3, when the toothbrush works normally, the teeth will exert a load pressure $F_4$ on the cleaning element 21. Since the brush handle housing 22 and the handle interface 111 are connected together by the tight fit of the brush handle fastening arc surface 27 and the fastening arc surface 28 with the fastening arc surface 115 and the fastening arc surface 116 of the handle interface. Under the action of the load pressure $F_4$, the handle interface 111 will bend. The handle interface 111 is made of plastic injection molding. The bending strength of the plastic is small, so the handle interface 111 produces a larger bending under the action of the load pressure $F_4$, thereby reducing the cleaning effect of the toothbrush. Even under the action of the larger load pressure $F_4$, the bending of the handle interface 111 exceeds the limit value of the material itself, resulting in the fracture of the handle interface 111. The disengagement of the head assembly 2 from the handle portion 1 during the working process of the toothbrush causes human injury, such as suffocation, etc. For this reason, the present invention provides a blind hole 114 of the handle interface in the handle interface 111. The blind hole 114 of the handle interface is arranged roughly around the central axis of the handle interface 111, and the blind hole 114 of the handle interface is used to accommodate the vibration shaft 3 and is fastened with the vibration shaft 3. The material of the vibration shaft 3 is metal, preferably stainless steel. Since the bending strength of metal is more than 7 times that of plastic, and the vibration shaft 3 is securely connected by the tight fit with the blind hole 114 of the handle interface, the bending strength of the handle interface 111 with the metal vibration shaft 3 is much greater than that of the handle interface 111 of pure plastic, which can therefore avoid the degradation of the cleaning effect and the fracture of the handle interface 111. The use of the toothbrush is more efficient and safer. Apparently, there is no specific requirement on the length of the vibration shaft 3. The length of the vibration shaft 3 can be either greater than, or less than or equal to the depth of the blind hole 114 of the handle interface. The metal vibration shaft 3 that is tightly fitted with the handle interface 111 increases the bending strength of the handle interface 111, such that the vibrating electric toothbrush of the present invention is more efficient and safer, and the service life of the toothbrush is prolonged.

The applicant has also derived from experiments that if the included angle among the central axis $L_1$ of the brush handle housing 22, the central axis $L_2$ of the vibration shaft 3, and the central axis $L_3$ of the buckle cantilever 24 is less than 30°, and the included angle between the buckle protrusion 29 and the axis $L_2$ of the vibration shaft 3 is 60°-120°, the handle interface 111 can be easily inserted into the head assembly 2. After insertion, the head assembly 2 and the handle portion 1 may produce the retention force $F_1$, the retention force $F2_R$, and the retention force $F3_R$, so the head assembly 2 and the handle portion 1 can be reliably connected. The rear end portion of the brush handle housing 22 is provided with a hollow portion for accommodating the handle interface 111 and the vibration shaft 3. Due to the above structure, the handle interface 111 can be easily inserted into the head assembly 2. After insertion, the head assembly 2 and the handle portion 1 generate the retention force $F_1$, the retention force $F2_R$, and the retention force $F3_R$, so the two can be reliably connected. In a similar way, the user can easily overcome the retention force FIR, the retention force $F2_S$, and the retention force $F3_S$ to pull out the head assembly 2 from the handle portion 1. The head assembly 2 may be conveniently connected to or separated from the handle portion 1 by the user's plugging and unplugging. At the same time, the handle portion 1 can be reused, thereby saving the use cost. Moreover in the present invention, the vibration shaft 3 can be directly assembled into the blind hole 114 of the handle interface without overmolding or over-injection molding process as in conventional manufacturing, such that the injection molding process of the brush handle housing 22 is simplified.

Figure 9:
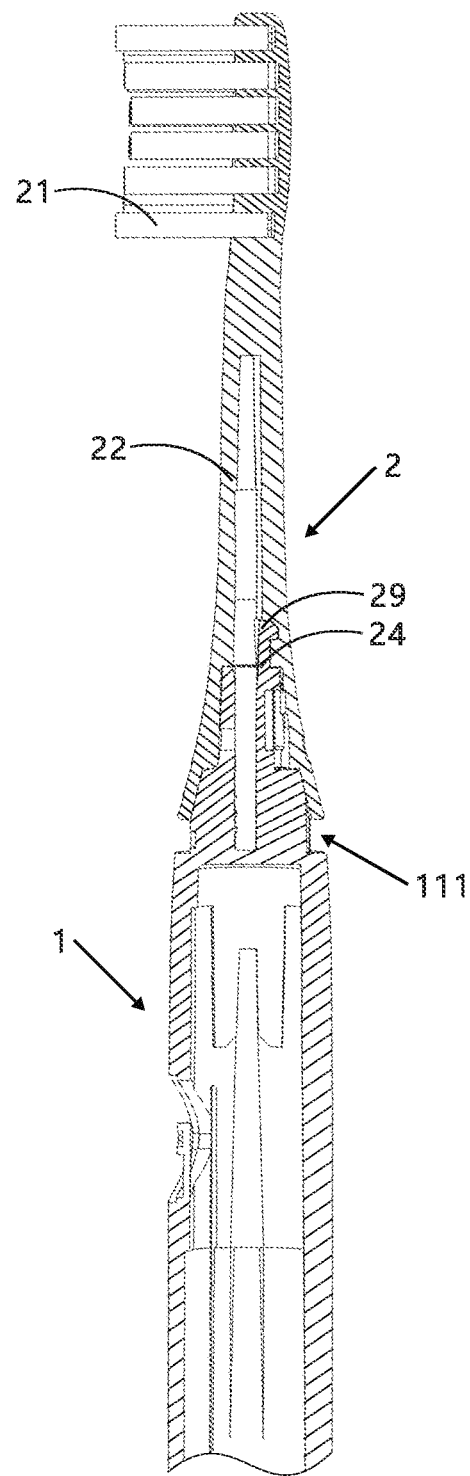
FIG. 9 is a schematic diagram of another embodiment of the vibrating electric toothbrush of the present invention.

FIG. 9 shows another example of the present invention, in which the buckle combination part is provided on the handle interface 111. The cavity and the locking surface matching the buckle combination part are provided on the brush handle housing 22. The buckle protrusion 29 protrudes toward the direction close to the brush handle housing 22, and the two are fitted to produce the buckle retention force $F_1$. The specific analysis is the same as the above, and will not be repeated here.

In the present invention, the handle interface 111 on the handle portion 1 is provided with a blind hole 114 of the handle interface, and a metal vibration shaft 3 is assembled in the blind hole 114 of the handle interface. The metal vibration shaft 3 is tightly fitted with the handle interface 111. The material of the handle interface 111 is plastic. Due to the small size of the vibrating electric toothbrush and small bending strength of the pure plastic handle interface 111, the built-in metal vibration shaft 3 greatly increases the bending strength of the handle interface 111, thereby solving the problem of reducing the cleaning efficiency of the toothbrush and breaking the handle interface, which can not only ensure that the vibrating electric toothbrush is more efficient and safer, but also does not increase the volume of the connecting part and thereby does not increase the volume of the toothbrush.

What is claimed is:

1. A connecting structure for connecting a head assembly and a handle portion of a vibrating electric cleaning appliance, the vibrating electric cleaning appliance including a handle portion (1) and a head assembly (2) detachably mounted on the handle portion (1); the handle portion (1) including a handle housing (11) with a hollow portion, a vibration motor (19), and a vibration shaft (3); the head assembly (2) being assembled on the handle portion (1) along an axial direction of the vibration shaft (3), the head assembly (2) including a cleaning element (21) and a brush handle housing (22); the brush handle housing (22) having a central axis ($L_1$); a handle interface (111) being provided on the top of a front end of the handle housing (11); the handle interface (111) and the vibration shaft (3) being accommodated in the hollow portion of the rear end of the brush handle housing (22), wherein a blind hole (114) of the handle interface is provided in the middle of the handle interface (111); the rear end portion of the vibration shaft (3) is tightly inserted into the blind hole (114) of the handle interface; a buckle cavity (113) of the handle interface is provided on the handle interface (111) in a length direction of the vibration shaft (3) along a direction perpendicular to the central axis ($L_2$) of the vibration shaft (3); the front end surface of the buckle cavity (113) is a buckle locking surface (112) of the handle interface; a buckle combination part including a buckle cantilever (24) and a buckle protrusion (29) is provided in the brush handle housing (22) along its rear end; the buckle combination part extends along a direction from the head assembly (2) towards the handle portion (1) in the brush handle housing (22); the buckle cantilever (24) is formed in the brush handle housing (22) and is separated from the brush handle housing (22); the buckle cantilever (24) has a central axis ($L_3$); the rear end of the buckle cantilever (24) is provided with the buckle protrusion (29); a locking surface (23) of the buckle combination part is provided on the buckle protrusion (29); the buckle protrusion (29) is accommodated by the buckle cavity (113).

2. The connecting structure according to claim 1, wherein a contact part of the cleaning element (21) and an object to be cleaned is located on one side of the central axis ($L_1$) of the brush handle housing, and the buckle cavity (113) and the buckle protrusion (29) are located on one side of the central axis ($L_1$) of the brush handle housing (22) opposite to the cleaning element (21).

3. The connecting structure according to claim 1, wherein the buckle combination part extends along a direction from the head assembly (2) towards the handle portion (1) parallel to a direction of the central axis ($L_1$) of the brush handle housing (22) in the brush handle housing (22).

4. The connecting structure according to claim 1, wherein the included angle among the central axis ($L_1$) of the brush handle housing (22), the central axis ($L_2$) of the vibration shaft (3) and the central axis ($L_3$) of the buckle cantilever (24) is less than 30°, and the included angle between the buckle protrusion (29) and the central axis ($L_2$) of the vibration shaft (3) is 60°-120°.

5. The connecting structure according to claim 1, wherein there are at least one group of the buckle combination part and the buckle cavity (113) that are respectively provided in the brush handle housing (22) or on the handle interface (111), and generate a buckle retention force ($F_1$).

6. The connecting structure according to claim 5, wherein the buckle retention force ($F_1$) is 0.5N to 50N.

7. The connecting structure according to claim 6, wherein the buckle retention force ($F_1$) is 0.7N to 30N.

8. The connecting structure according to claim 7, wherein the buckle retention force ($F_1$) is 10N to 20N.

9. The connecting structure according to claim 1, wherein the material of the vibration shaft (3) is stainless steel.

10. The connecting structure according to claim 9, wherein the rear end portion of the vibrating shaft (3) is provided with grooves (31).

11. The connecting structure according to claim 1, wherein the rear end portion of the vibration shaft (3) is provided with grooves (31).

* * * * *